US012754525B2

(12) United States Patent
Sieckmann

(10) Patent No.: US 12,754,525 B2
(45) Date of Patent: Oct. 6, 2026

(54) DEVICE AND METHOD FOR PROVIDING FUNCTIONALITIES

(71) Applicant: LEICA MICROSYSTEMS CMS GMBH, Wetzlar (DE)

(72) Inventor: Frank Sieckmann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 433 days.

(21) Appl. No.: 18/279,632

(22) PCT Filed: Feb. 24, 2022

(86) PCT No.: PCT/EP2022/054727
§ 371 (c)(1),
(2) Date: Sep. 1, 2023

(87) PCT Pub. No.: WO2022/184556
PCT Pub. Date: Sep. 9, 2022

(65) Prior Publication Data

US 2024/0142933 A1 May 2, 2024

(30) Foreign Application Priority Data

Mar. 4, 2021 (DE) .................... 10 2021 105 237.8

(51) Int. Cl.
*G05B 19/042* (2006.01)

(52) U.S. Cl.
CPC .................... *G05B 19/0426* (2013.01); *G05B 2219/25084* (2013.01); *G05B 2219/25086* (2013.01); *G05B 2219/25428* (2013.01)

(58) Field of Classification Search
CPC ...... G05B 19/0426; G05B 2219/25084; G05B 2219/25086; G05B 2219/25428
See application file for complete search history.

(56) References Cited

U.S. PATENT DOCUMENTS 6,668,319 B1 12/2003 Newell, Jr. et al.
9,213,230 B1 12/2015 Amidon et al.
(Continued)

FOREIGN PATENT DOCUMENTS

DE 10105946 A1 10/2001
DE 102013201555 A1 8/2013
(Continued)

*Primary Examiner* — Michael W Choi
(74) *Attorney, Agent, or Firm* — LEYDIG, VOIT & MAYER, LTD.

(57) ABSTRACT

A device for providing functionalities includes at least one storage unit providing a first parameter set and a second parameter set. The first parameter set indicates which functionalities are to be made available by the device to other devices. The second parameter set indicates which functionalities are to be made available by the other devices to the device. The device further includes a communication interface configured to obtain a third parameter set from a second device. The third parameter set indicates which functionalities are to be made available by the second device. The device further includes a processing unit configured to compare the third parameter set with the second parameter set, to select one or more functionalities made available by the second device for use, and to establish a payload connection with the second device if at least one functionality has been selected for use.

20 Claims, 3 Drawing Sheets

(56) References Cited

U.S. PATENT DOCUMENTS

| | | | | |
|---|---|---|---|---|
| 9,592,779 | B2 | 3/2017 | Pietsch et al. | |
| 10,728,253 | B2 | 7/2020 | Seed et al. | |
| 11,108,627 | B2 | 8/2021 | Smith et al. | |
| 2004/0257622 | A1* | 12/2004 | Shibaki ................ | H04N 19/187 715/204 |
| 2006/0092452 | A1* | 5/2006 | Simpson ............... | G06F 3/1288 358/1.14 |
| 2008/0250236 | A1 | 10/2008 | Bauereiss et al. | |
| 2015/0029120 | A1 | 1/2015 | Sieckmann | |
| 2018/0012182 | A1 | 1/2018 | Tan et al. | |
| 2018/0262571 | A1 | 9/2018 | Akhtar | |
| 2018/0323999 | A1 | 11/2018 | Stolpe et al. | |

FOREIGN PATENT DOCUMENTS

| | | | |
|---|---|---|---|
| EP | 0972237 | A1 | 1/2000 |
| EP | 1929382 | B1 | 6/2008 |
| EP | 3399375 | A1 | 11/2018 |
| JP | 2017/538209 | A | 12/2017 |
| JP | 2019/502206 | A | 1/2019 |
| JP | 2020/503784 | A | 1/2020 |
| JP | 2020/038345 | A | 3/2020 |
| WO | WO 2008145170 | A1 | 12/2008 |
| WO | WO 2017/106224 | A1 | 6/2017 |
| WO | WO 2020101637 | A1 | 5/2020 |

* cited by examiner

DEVICE AND METHOD FOR PROVIDING FUNCTIONALITIES

CROSS REFERENCE TO RELATED APPLICATIONS

This application is a U.S. National Phase application under 35 U.S.C. § 371 of International Application No. PCT/EP2022/054727, filed on Feb. 24, 2022, and claims benefit to German Patent Application No. DE 10 2021 105 237.8, filed on Mar. 4, 2021. The International Application was published in German on Sep. 9, 2022 as WO 2022/184556 A1 under PCT Article 21(2).

FIELD

Embodiments of the present invention relate to a device and a method for providing functionalities.

BACKGROUND

Machines, appliances, or other devices and applications, such as, for example, microscopes, computers, and also industrial production facilities are typically designed such that the individual components or parts of such a machine or such an appliance cooperate or interact in such a way that the respective machine or the respective appliance (as a whole) functions properly.

However, a plurality of different machines, appliances, other devices or applications are generally unable to cooperate or interact, or at most can cooperate or interact with each other to a limited extent. Thus, for example, a printer can be connected to a computer so that the printer can be used by the computer or a user of the computer. However, this (generally) does not allow any other use of the printer. In the industry, especially in what is called "Industry 4.0," it is known that a plurality of machines can interact in a certain way, but only within the framework of a predefined process sequence where one machine after another performs certain tasks.

In view of the above, it is desirable to provide a way to allow a plurality of devices to interact in the sense of one whole or one unit.

SUMMARY

A device for providing functionalities includes at least one storage unit in which a first parameter set and a second parameter set are provided. The first parameter set includes one or more first parameter values indicating whether a functionality associated with a first parameter value is to be made available by the device to other devices. The second parameter set includes one or more second parameter values indicating whether a functionality associated with a second parameter value is to be made available by the other devices to the device. The device further includes a communication interface configured to obtain at least one third parameter set from a second device. The third parameter set includes third parameter values indicating which functionalities associated with the third parameter values are to be made available by the second device. The device further includes a processing unit configured to compare the third parameter set with the second parameter set, to select, based on the comparison, one or more of the functionalities made available by the second device for use, and to establish a payload connection with the second device if at least one functionality made available by the second device has been selected for use.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
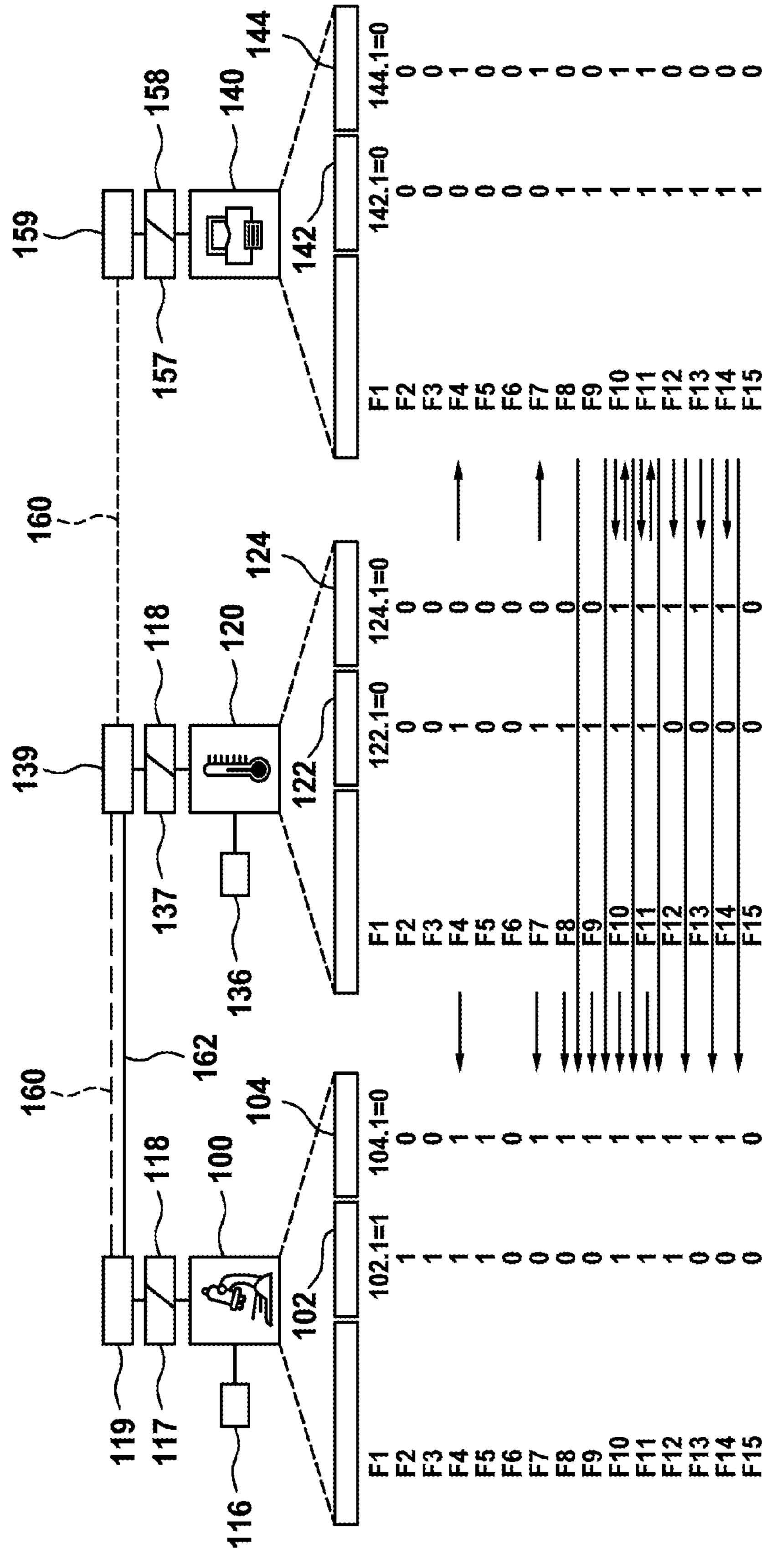
FIG. 1*a* schematically shows a device according to some embodiments.

Embodiments of the invention relate to a device that is used to provide functionalities and which has at least one storage unit, a communication interface, as well as a processing unit (e.g., with a processor). A wide variety of devices or appliances or machines, and also certain parts or components thereof, can be used as such a device. It is conceivable, for example, that the device may include or be part of at least one of the following: a computer, a microscope, a microtome, a high-pressure freezer, an automated stainer, a coater, a pipetting robot, a pick-and-place robot (in particular in the form of a robot that applies a first material on a second material), a climate chamber, a laboratory automation device, a motorized stage, a heating system, a cooling system, an injection system, and an illumination device including, for example, a laser, an LED, and/or a lamp housing. However, other laboratory apparatuses, for example, are generally also possible. It should be noted in particular that a device does not have to be a complete unit, but may also be constituted of parts of a unit. Although embodiments of the present invention are sometimes described with reference to a specific device, it is not limited thereto, as will be apparent from the following explanations.

A first parameter set and a second parameter set are provided in the at least one storage unit. The first parameter set includes one or more first parameter values which indicate whether a functionality associated with a first parameter value can be made available by the device to other devices. The second parameter set includes one or more second parameter values which indicate whether a functionality associated with a second parameter value is to be made available by other devices to the first device.

In other words, the first parameter set or the first parameter values relate in particular to functionalities that the device itself can perform or provide and which it can in particular also make available to one or more other devices. If the device is, for example, a microscope, the functionality may be the indication of a position (e.g., in the x, y or z direction) of a sample stage and/or the adjustability thereof. A first parameter value then indicates, for example, that the device; i.e., the microscope, can adjust a z-direction of the sample stage and make this functionality available to other devices, for example, to a tablet or another computer.

The second parameter set or the second parameter values then relate in particular to functions or functionalities that the device itself cannot perform or provide, but which would be desirable, or would also be desirable during use of the device, and which therefore are to be made available by another device. In the example mentioned, the microscope may possibly not be able to measure temperature itself, but information about it would be desirable, for example, when viewing a sample. The other devices could then be, for example, a temperature-measuring device or other appliances, which, among other things, are able to measure a temperature or merely to provide a current temperature value in a different way, as the case may be.

The communication interface is configured to obtain at least one third parameter set from a second device (i.e., a device other than the receiving device). This third parameter set includes third parameter values which indicate which of the functionalities associated with the third parameter values can be made available by the second device (to the first or receiving device). In other words, the third parameter set or the third parameter values correspond to the first parameter set or the first values, but in the second device, not in the (first) device. In particular, the third parameter set or the third parameter values thus relate to functionalities that the second device (i.e., not necessarily the (first) device itself) can perform or provide. Thus, in the example mentioned above, the second device could be, for example, a temperature-measuring device. This temperature-measuring device would then have to be able to perform a temperature measurement and in particular also to allow the (first) device to perform this temperature measurement or to obtain a temperature value.

In this sense, machines (or the devices mentioned) have various, already built-in sensors (e.g., temperature-measuring systems) and actuators (e.g., electronic switches) and possibly other functionalities and associated data. However, such machines also have "desires" for further sensors and/or actuators that are not already built into the in the machine itself; i.e., "desires" regarding data that is (still) missing. Parameter lists indicate for each machine (device), e.g., in a standardized form, the sensors, data, and actuators it can offer (i.e., the first or third parameter values mentioned above) and which sensors, data, and actuators it "desires" (i.e., the second parameter values mentioned above).

The processing unit is configured to compare the third parameter set with the second parameter set, and to select, on the basis of the comparison, functionalities of the second device for use, and to establish a payload connection with the second device if at least one functionality of the second device has been selected for use. By comparing the second and third parameter sets, it is thus possible to compare which functionalities the (first) device would like to have or use and which of these can be provided by the second device. If this is the case for at least one functionality, in the previous example the temperature measurement, then this functionality can be selected if desired and then also be made available in the (first) device. For this purpose, the above-mentioned payload connection is established. "Selecting a functionality" is understood to mean in particular that it is determined that this functionality (of the second device) is to be made available in the (first) device (via the payload connection).

Thus, if, for example, a plurality of different machines (devices) come together, e.g., by connecting themselves (or being connected) via a network to form a group, the machines can automatically compare their parameter lists and—in keeping with the above-mentioned example of "desires"—make the desired sensors, data, and actuators available to each other, either automatically, manually, and/or in a policy-controlled manner. If, for example, a microscope "desires" a camera and the camera a controllable light source, the microscope may automatically make its light source available to the camera, and the camera may, in return, make itself available to the microscope.

The mutual making available is preferably automatic. Additional parameters may further refine the "desires" of the machines. For example, a microscope (in the example above) might desire a color camera; therefore, black-and-white cameras, for example, would not connect (or not be able to be connected) to the microscope. Nevertheless, the camera could use the "desired" light module of the microscope. The exact procedure of the connection may be controlled, for example, by rule sets. Policies, for example, for a GPPS-compliant exchange, are then also processed in the rules. The interfaces may be of any suitable type, e.g., radio standards such as 5G, etc., or cables such as RJ45, etc. The protocols used may be of any known type, e.g., TCP/IP. The security standards of the exchange may be any standard, e.g., SSL, TLS.

The payload connection may also be automatically routed via a plurality of machines (repeater technology), and in the case of wireless connections. Moreover, the relevant parameter lists of a machine may be updated in order to reflect new capabilities or "desires" after software updates of a machine.

In this respect, it should be noted that such a payload connection is in particular designed in such a way that the functionality can be performed in or by the second device, but a command or a trigger for this comes or may come from the (first) device and is possibly also issued there. Thus, a temperature measurement can be requested, for example, by a user of the microscope (or possibly automatically by the microscope). To this end, the second device is suitably controlled via the payload connection.

In this context, the interconnection of a plurality of machines or devices or parts thereof to form a group can be accomplished both statically and dynamically. The static case includes, for example, devices that are installed on-site, such as the previously mentioned devices: microscope, temperature-measuring device, and printer, which (possibly only initially) correspondingly connect to each other and exchange or make available functionalities. As soon as a change in functionality occurs in one of the devices, this can be updated again.

The dynamic case includes, for example, the interaction of mobile devices with other devices, possibly also ones which are installed on-site. For example, when the user of a mobile terminal device (such as a notebook, smartphone, tablet, or the like) as such a device moves, for example, in a building (with this device), the surrounding devices (such as laboratory apparatuses, computers, printers, thermometers, etc.) can dynamically make their functionalities available, and/or the mobile terminal device can make its functionalities available to one or more of these devices (here, too, such making available may be restricted by corresponding security/license-dependent policies). Thus, depending on where the user is located, other options, for example, are available to him or her via his or her mobile terminal device. For example, it may be that the user sits down at a microscope in a laboratory and the tablet he or she carries with him/her is automatically connected as an output and/or control unit of the microscope. When the user is later at a printer with the tablet, the tablet can serve, for example, as an input/display device for the printer, provided this printer allows this.

Thus, In summary, there is in particular a certain number (or totality) of functionalities, which the (first) device and the second device, or all (considered) devices, can perform or provide together. It is understood that in practice, some functionalities, identical or similar ones (see also the later explanations), may also be provided by several devices. A list or table with all these functionalities (and possibly also further specifications/variants of these functionalities) may be stored, for example, in each device or, there, in a storage unit. The first parameter set or the first parameter values then indicate which of these the (first) device can provide (in practice, these will be only a few), the second parameter set or the second parameter values indicate which of these the (first) device would like to have or desires, and the third parameter set or the third parameter values indicate which of these can be made available by the second device to the (first) device. These can be integrated into the (first) device via the payload connection when necessary and desired, so that they are available or can at least be used there as well.

In other specifications, the parameters that indicate the functionalities could then be further specified, indicating, for example, in which specific variant a particular functionality is desired or provided. For example, a temperature measurement may be provided by various devices, but with different accuracies. It may then also be specified which of these is desired or which may possibly be accepted as a fallback solution.

In this way, a logical group or system (in the sense of a domain) can be formed of a plurality of devices, where some devices, as it were, "lend" certain functionalities to other devices; i.e., make them available via the payload connection. A logical group is therefore understood in particular in the sense that the individual devices (i.e., machines or parts of machines) preferably automatically interconnect with each other to form a new machine, a kind of "super-machine," by interchanging their sensor, data, and actuator functionalities and capabilities. Thus, a user of one of these devices can not only use the functionalities of this one device itself, but also (preferably respective portions of) the functionalities of other devices. The sensors, data, and actuators of other devices (machines) can thus, in part, also be used in one's own device (machine).

The integration of such functionalities which correspond to the third parameter set or the third parameter values can be accomplished in an automated manner by comparison in the comparison unit (which may, for example, include or be part of a processor). A user does not need to do anything to accomplish this. Thus, in the above example, the temperature measurement functionality is, for example, automatically integrated and made available during use of the microscope if both the temperature measurement is desired or required by the microscope and another device (in the group) can make it available.

Consequently, there may also occur a case where a certain functionality is desired in the (first) device, but no other device (in the group) can make it available. In this respect, it is preferred if the (first) device or, there, the comparison unit, is configured to output, on the basis of the comparison, feedback or information that a functionality corresponding to a second parameter value cannot be selected for use or cannot be made available. This can be done, for example, by graying out functions in a user interface (GUI) of the (first) device, corresponding pop-up windows, lighting up an LED, audible messages, or the like.

Communication of the (first) device with the second or, more generally, other devices can take place via the mentioned communication interface. While in order to obtain or receive the third parameter set or portions thereof, it is only necessary that, for example, a simple message with relevant information can be received, the establishment of the payload connection sometimes requires the exchange of additional data and/or information (e.g., control signals). In principle, the communication interface may preferably include at least one of the following: a wired interface, a wireless interface, an optical interface, an inductive interface, an acoustic interface. In particular, there may also be several of each type and/or several types of interfaces. Possible examples include: a WLAN interface, a Bluetooth interface, a fiber-optic interface or a fiber-optic connection, a mobile cellular connection (in particular a mobile cellular connection based on the 5G standard), a USB interface, an interface to a bus system, or a parallel interface.

In this context, it should also be noted that a bi-directional communication connection is not necessarily required in order to output or transmit messages with parameter sets, for example. It is also conceivable to use, for example, so-called broadcast messages, as is the case with Bluetooth advertising, for example.

It should further be noted that the (first) device and the second device do not necessarily have to be directly communicatively connected to each other. Rather, it may be sufficient to integrate both devices (and also other devices) into a network (intranet, Ethernet, possibly also partly via direct connections to devices that are otherwise integrated, or automatically routed indirectly via repeaters). This also allows the individual devices to be spaced far apart from one another, and ultimately even to be distributed across the world.

As mentioned earlier, a wide variety of devices or appliances (or also parts thereof) can be used as the (first) device. Therefore, the device preferably further includes at least one of the following elements: an actuator, a sensor, a data storage unit, a data read unit, a data output unit, a computing unit, a control unit, a power supply, a peripheral device connected to the device. Functionalities of the at least one element are indicated in the first parameter set with associated first parameter values. Thus, these elements provide in particular the functionalities already discussed at the outset or serve to enable them to be performed.

In this context, it should also be noted that the terms "actuator" and "sensor" as well as "data" are to be understood in a very general or broad sense. An actuator may not only be an electric drive that causes mechanical changes, but also an electrically driven system that causes other physical status changes, e.g., a display, a light source such as an LED, a heating element such as a heating coil, a cooling device, for example one having Peltier elements, and the like. An actuator converts signals (e.g., commands originating from the control computer) into mechanical motion or other physical variables (e.g., pressure or temperature) and thus actively intervenes in the process. Thus, in the case of a microscope as a (first) device, an actuator may be, for example, a drive for adjusting a position of the sample stage, but also a display on the microscope or a light source.

A sensor is in particular a technical component capable of detecting, either qualitatively or quantitatively as a measured quantity, physical properties (e.g., heat quantity, temperature, humidity, pressure, sound-field quantities, brightness, acceleration) or chemical properties (e.g., pH value, ionic strength, electrochemical potential) and/or the material properties of its environment. These variables can then be detected, for example, by means of physical, chemical, or biological effects and converted into an electrical signal that can be further processed. A sensor may in particular also be a so-called "smart sensor." A smart sensor (also known as intelligent sensor) is, for example, a sensor which, besides actually acquiring measured quantities, can combine the (complete) signal conditioning and signal processing in one housing. Such complex sensors generally include, among other things, a microprocessor or microcontroller, complex logic units such as FPGAs, and provide standardized interfaces for communication with higher-level systems, for example, via fieldbus systems, sensor networks, IO-Link.

Preferably, the (first) device includes, as a sensor, at least one of the following: a temperature sensor, a pressure sensor, a position sensor, a GPS sensor, an acceleration sensor, a current sensor, a voltage sensor, an optical sensor, an image sensor (e.g., a camera), a motion sensor, a humidity sensor.

However, within the scope of this application, a sensor is also understood to mean a purely digitally acquired measured value that determines a software status, for example, a counter indicating the number of times a measurement has been made.

Embodiments of the invention also relate to a method in which a (first) device establishes a payload connection with a second device when necessary, so that a functionality of the second device can also be integrated or made available in the first device. The first device is in particular a device according to embodiments of the invention as described in detail above. The method includes the following steps:

providing, in a first device, a first parameter set including one or more first parameter values which indicate whether a functionality associated with a first parameter value can be made available by the device to other devices; providing, in the first device, a second parameter set including one or more second parameter values which indicate whether a functionality associated with a second parameter value is to be made available by other devices to the first device; obtaining at least one third parameter set of a second device, the third parameter set including third parameter values which indicate which of the functionalities associated with the third parameter values can be made available by the second device; and comparing the third parameter set with the second parameter set, selecting, on the basis of the comparison, functionalities of the second device for use, and establishing a payload connection with the second device if at least one functionality of the second device has been selected for use.

For more detailed explanations, reference is made here to the above statements regarding the device, which apply analogously to the method. Similarly, the preferred embodiments to be described hereinafter also apply analogously to the device(s).

Preferably, the method further includes the steps of: obtaining a fourth parameter set of the second device, the fourth parameter set including fourth parameter values which indicate which of the functionalities associated with the fourth parameter values are desired by the second device; comparing the fourth parameter set with the first parameter set, and, on the basis of the comparison, sending to the second device a message indicating which desired functionality can be made available.

Thus, the fourth parameter set or the fourth parameter values basically correspond to the second parameter set or the second parameter values, but in the second device. Like the first device, the second device may also desire functionalities which it does not have or cannot provide itself. Accordingly, after the matching or comparison, the first device can inform the second device which functionalities it (the first device) could make available to it (to the second device). This is advantageous, especially when the second device cannot perform a comparison itself, but can only communicate its need or desire for functionalities.

Preferably, the parameter values are (or possibly become) set as active or not active, respectively, the comparison including in particular: comparing the parameter values for each of the associated functionalities indicated in the parameter sets. In this context, a parameter value set as active can be understood to mean that the associated functionality can be made available (which applies in particular to the first and third parameter values) or that the associated functionality is to be made available by another device (which applies in particular to the second and fourth parameter values). Accordingly, a parameter value that is set as not active (or inactive) can be understood to mean that the associated functionality cannot be made available (which applies in particular to the first and third parameter values), or that the associated functionality should not or does not need to be made available by another device (which applies in particular to the second and fourth parameter values).

However, it is also useful if such parameter values can be selectively set to active or not active, regardless of whether the relevant functionality can or should be made available. For example, for a functionality that could in principle be made available by the (first) device, the associated first parameter value may be set as not active, which means that this functionality should not or must not be made available to another device. This may be the case for security or data protection reasons, for example. This applies analogously to a second parameter value; i.e., a certain functionality may in principle be desirable, but nevertheless, it should not be integrated for security reasons, for example.

It is also conceivable that the setting to active (in the sense of enablement) may optionally be subject to another hurdle, for example, user authentication via a PIN, a confirmation query, or the like; i.e., the setting to active is subject to certain rules. In other words, a particular functionality of one device would only be made available to other devices (and could only be integrated therein) if this functionality is enabled by a user a policy (a predetermined set of rules) or was bound to license agreements and is only enabled with a valid license (dongle activation).

In view of this, it is also useful if a functionality of the second device is selected for use if the second and the third parameter values are set as active for this functionality.

Preferably, each functionality is identified by a unique identifier. This is true in particular within a group or system of devices which are interconnected via a network and between which functionalities can be provided. Thus, each device within the group uses the same identifier for a particular functionality.

It is also useful if obtained parameter values are stored for the associated functionalities, for example, in the storage unit. This allows them, for example, to be kept permanently available, even after a restart, for example.

Preferably, the method also includes outputting (or providing) a first partial parameter set which contains at least a portion of the first parameter values and/or outputting (or providing) a second partial parameter set which contains at least a portion of the second parameter values, for reception by further devices. In this way, it is not necessary to output the complete parameter sets to other devices, but rather, it is possible to output only the available active functionalities or only the desired functionalities. "Outputting" is understood to mean in particular that the parameter sets are made available to other devices, in particular in such a way that they are can be transmitted to and received by other devices as data or information.

The outputting may advantageously be accomplished by transmission to one or more further devices that are connected to the device, the transmission being in particular via a bi-directional communication connection. The speed of a data transmission (e.g., of the measured value of a sensor array) may in particular also be taken into account in the communication connection. For example, there may be cases where latency requirements on the data transmission require synchronous data transmission. In other cases, however, asynchronous data transmission, for example, may be sufficient. However, it is also conceivable that the outputting may be accomplished by a broadcast message, as is the case with Bluetooth advertising, for example. In this connection, the outputting is preferably performed in response to a request to output a first and/or a second parameter set, which request originates from, for example, the second or another device.

The functionalities preferably include at least one of the following: controlling an actuator in the device (in particular synchronously; i.e., faster than a predetermined transmission time (permissible latency/delay time) and/or in synchronization with a clock signal (keyword: synchronous data transmission), or asynchronously; i.e., without being bound to a predetermined transmission time and/or not in synchronization with a clock signal), outputting data stored in the device, outputting data measured by the device (in particular synchronously or asynchronously, as explained above), processing data by the device, a property of the device. With regard to the concept of the actuator, reference is made to the explanations given above with respect to the device, which apply here analogously.

"Outputting data," optionally in synchronization with clock signals, can be understood to mean, in particular, providing or making available this data to other or further devices. This can be accomplished in particular using a communication interface. "Outputting data" can also be understood to mean outputting data visually and/or audibly and/or haptically (e.g., via a display or a loudspeaker). A property of the device is understood to mean, in particular, a physical or other property of the device that does not necessarily concern the performance of an action. This may include, for example, metadata, an indication of a current time or time of day, a (local) position, and the like. In this context, it should also be noted that although a particular functionality may be provided, for example, by different devices at the same time, it then differs in its individual form. For example, two different devices may each include a position as a functionality, but the specific position value thereof may then differ depending on the locations of the devices. This applies equally to the indication of time and the corresponding specific values.

Preferably, a payload connection with a further device is established in response to a use request, and a functionality specified in the use request is then made available to the further device. Preferably, the parameter values are each specified as an attribute of an object that is associated with a functionality. In this context, an "object" can be understood to be in particular an object or "shared object" in the sense of object-oriented programming.

Embodiments of the invention also relate to a computer program having program code adapted to perform a method according to embodiments of the invention when executed on a processor or on an inventive device which may itself have a suitable computing unit or a processor.

Further advantages and embodiments of the invention will become apparent from the description and the accompanying drawings.

It will be understood that the aforementioned features and those to be described below can be used not only in the specified combinations, but also in other combinations or alone without departing from the scope of the present invention.

Embodiments of the invention are schematically illustrated in the drawings with reference to an exemplary embodiment and is described in the following with reference to the drawing.

FIG. **1*a* schematically shows a device 100 according to the invention in a preferred embodiment. Device 100 is integrated into a group or system having further devices 120 and 140**. This system may be a system according to the invention in a preferred embodiment. A method according to embodiments of the invention and aspects thereof will be described below on the basis of this system.

By way of example, device 100 is a microscope, device 120 is a temperature-measuring device, and device 140 is a printer. Microscope 100 includes a memory unit 117, a processing unit 118 (which has, for example, a processor and may also serve as or be part of a computing unit or a control unit), and a communication interface 119. This applies analogously to the other devices. For example, the temperature-measuring device includes a storage unit 137, a processing unit 138, and a communication interface 139. Printer 140 includes a storage unit 157, a processing unit 158, and a communication interface 159. Although the storage unit, the processing unit, and the communication interface are shown separately here, these components may each be part of the respective device.

In addition, microscope 100 includes, by way of example, an actuator 116 for adjusting a sample stage; temperature-measuring device 120 includes, by way of example, a sensor 136 for temperature measurement (i.e., a temperature sensor).

Devices 110, 120 and 140 are communicatively connected to each other via communication interfaces 119, 139 and 159, thus forming a network. The specific type of communication connection 160 is not relevant here and may be, for example, wireless or wired, as well as direct or indirect (such as between devices 100 and 140, for example). In this respect, reference should also be made to the above explanations. Also, a plurality of communication connections may be used in parallel, for example, a sufficiently fast standard communication connection for "slow" asynchronous links and/or a further communication connection that enables a fast and interference-free link with predeterminable latencies, such that a synchronous data link also becomes possible.

A kind of list with different functionalities is provided or made available in each of the devices 100, 120 and 140 or, there, in the respective storage units. This list may include, for example, all functionalities that can be provided by devices 100, 120 and 140 together. In the example shown, these are 15 different functionalities, which may be, for example, the following ones, which are designated as F1 through F15 in the figure: x-position of a sample stage (F1), y-position of a sample stage (F2), z-position of a sample stage (F3), temperature (F4), image acquisition (F5), pressure (F6), humidity (F7), date (F8), time (F9), metadata (F10), status (F11), position (F12), network (F13), color printing (F14), black-and-white printing (F15).

As mentioned earlier, typically, not every device provides all functionalities. Rather, each device provides only certain ones of them. For the following explanation, microscope 100 will represent a (first) device and temperature-measuring device 120 will represent a second device. The printer represents another device (from the microscope's point of view), which also applies to temperature-measuring device 120.

In the example shown, microscope 100 provides the following functionalities: x-position of a sample stage (F1), y-position of a sample stage (F2), z-position of a sample stage (F3), temperature (F4), image acquisition (F5), metadata (F10), status (F11), position (F12). Furthermore, a first parameter set 102 is provided which includes first parameter values that indicate these functionalities provided by microscope 100. For this purpose, the respective first parameter value is set to 1, by way of example. For the other functionalities, the first parameter value is set to 0, by way of example. In the figure, the first parameter value for functionality F1 is indicated as 102.1, which has the value 1; i.e., it holds that 102.1=1. Accordingly, it holds that 102.2=1, 102.3=1, 102.4=1, 102.5=1, 102.6=0, 102.7=0, 102.8=0, 102.9=0, 102.10=1, 102.11=1, 102.12=1, 102.13=0, 102.14=0, and 102.15=0.

Furthermore, there are functionalities which are to be made available to microscope 100 by other devices (temperature-measuring device 120 and printer 140 are available for this purpose in the example here); i.e., functionalities which are "desired" by the microscope. For this purpose, a second parameter set 104 including second parameter values that indicate this is provided in microscope 100 or its storage unit. In the example, the second parameter values indicate that the following functionalities are to be made available to microscope 100 by another device: temperature (F4), image acquisition (F5), humidity (F7), date (F8), time (F9), metadata (F10), status (F11), position (F12), network (F13), color printing (F14). For this purpose, the second parameter value is set to 1, by way of example. For the other functionalities, the second parameter value is set to 0, by way of example. In the figure, the second parameter value for functionality F1 is indicated as 104.1, which has the value 0; i.e., it holds that 104.1=0. Accordingly, it holds that 104.2=0, 104.3=0, 104.4=1, 104.5=1, 104.6=0, 104.7=1, 104.8=1, 104.9=1, 104.10=1, 104.11=1, 104.12=1, 104.13=1, 104.14=1, and 102.15=0. With regard to image acquisition (F5), it should be noted that microscope 100 may in principle provide this function itself, for example, via a built-in camera, but may nevertheless want to be able to acquire higher-quality images, for example, via a better, external camera. This applies analogously to temperature (F4), which will be illustrated in more detail hereinafter.

At this point it should be noted that there are further functionalities which the microscope can provide itself and which can also be made available to microscope 100 by other devices. This applies, for example, to: metadata (F10), status (F11), position (F12). In this case, both the respective first and second parameter values are set to 1.

The mentioned list, which includes all functionalities, may be provided or made available together with the first and second parameter values as a data set (which may be a "shared object") or as metadata in the microscope. In a simple case, this is a bit stream, where each pair of bits specifies a first and a second parameter value for a functionality. In the microscope example, such a bit stream for the first five functionalities would, for example, look like this: 1010100101.

Also, the individual parameters or parameter values may be not only numbers or even only bits, but also other values or software objects. It is also conceivable that several parameters or parameter values may be combined into one logical parameter. For example, it would be conceivable for the parameter values: x-position of a sample stage, y-position of a sample stage, z-position of a sample stage to be combined to form another parameter value: sample stage adjustment.

In the example shown, temperature-measuring device 120 provides the following functionalities: temperature (F4), humidity (F7), date (F8), time (F9), metadata (F10), status (F1). Furthermore, a third parameter set 122 is provided which includes third parameter values that indicate these functionalities provided by temperature-measuring device 120. For this purpose, the respective third parameter value is set to 1, by way of example. For the other functionalities, the third parameter value is set to 0, by way of example. In the figure, the third parameter value for functionality F1 is indicated as 122.1, which has the value 0; i.e., it holds that 122.1=0. Accordingly, it holds that 122.2=0, 122.3=0, 122.4=1, 122.5=0, 122.6=0, 122.7=1, 122.8=1, 122.9=1, 122.10=1, 122.11=1, 122.12=0, 122.13=0, 122.14=0, and 122.15=0.

Furthermore, there are functionalities which are to be made available to temperature-measuring device 120 by other devices (microscope 100 and printer 140 are available for this purpose in the example here); i.e., functionalities which are "desired" by the temperature-measuring device. For this purpose, a fourth parameter set 124 including fourth parameter values that indicate this is provided in temperature-measuring device 120 or its storage unit. In the example, the fourth parameter values indicate that the following functionalities are to be made available to temperature-measuring device 120 by another device: metadata (F10), status (F11), position (F12), network (F13), color printing (F14). For this purpose, the respective fourth parameter value is set to 1, by way of example. For the other functionalities, the second parameter value is set to 0, by way of example. In the figure, the fourth parameter value for functionality F1 is indicated as 124.1, which has the value 0; i.e., it holds that 124.1=0. Accordingly, it holds that 124.2=0, 124.3=0, 124.4=0, 124.5=0, 124.6=0, 124.7=0, 124.8=1, 124.9=1, 124.10=1, 124.11=1, 124.12=1, 124.13=1, 124.14=1, and 124.15=0.

Moreover, in the example shown, printer 140 provides the following functionalities: date (F8), time (F9), metadata (F10), status (F11), position (F12), network (F13), color printing (F14), black-and-white printing (F15). Furthermore, a parameter set 142 is provided which includes parameter values that indicate these functionalities provided by printer 140. For this purpose, the respective parameter value is set to 1, by way of example. For the other functionalities, the parameter value is set to 0, by way of example. In the figure, the parameter value that a functionality is provided is shown for functionality F1 as 142.1, which has the value 0; i.e., it holds that 142.1=0. Accordingly, it holds that 142.2=0, 142.3=0, 142.4=0, 142.5=0, 142.6=0, 142.7=0, 142.8=1, 142.9=0, 142.10=1, 142.11=1, 142.12=1, 142.13=1, 142.14=1, and 142.15=1.

Furthermore, there are functionalities which are to be made available to printer 140 by other devices (microscope 100 and temperature-measuring device 120 are available for this purpose in the example here); i.e., functionalities which are "desired" by the printer. For this purpose, a parameter set 144 including second parameter values that indicate this is provided in printer 140 or its storage unit. In the example, these parameter values indicate that the following functionalities are to be made available to printer 140 by another device: temperature (F4), humidity (F9), metadata (F10), status (F11). For this purpose, the respective parameter value is set to 1, by way of example. For the other functionalities, the parameter value is set to 0, by way of example. In the figure, the parameter value that a functionality is "desired" is shown for functionality F1 as 144.1, which has the value 0; i.e., it holds that 144.1=0. Accordingly, it holds that 144.2=0, 144.3=0, 144.4=1, 144.5=0, 144.6=0, 144.7=1, 144.8=0, 144.9=0, 144.10=1, 144.11=1, 144.12=0, 144.13=0, 144.14=0, and 144.15=0.

Figure 1B:
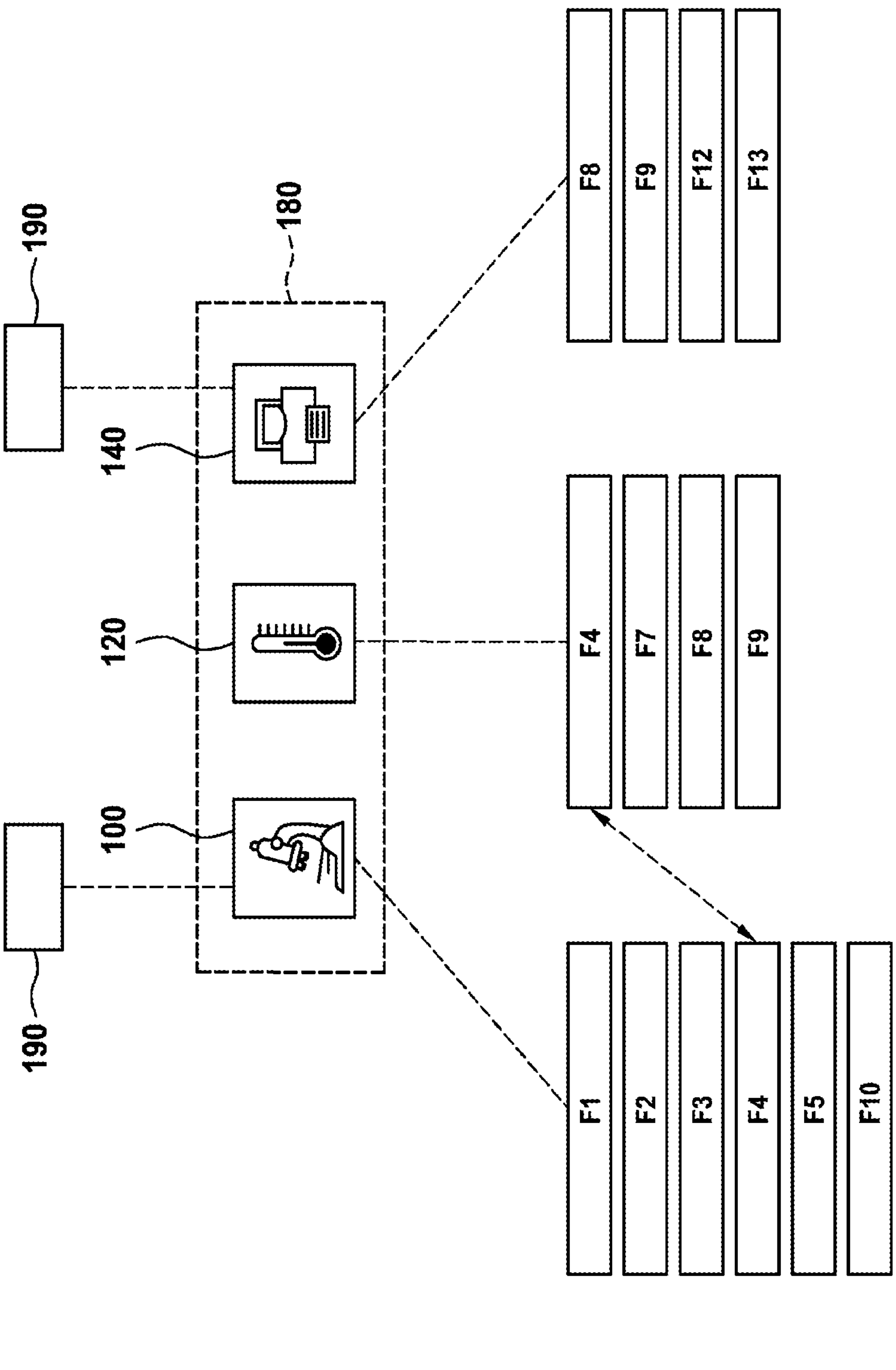
FIG. 1*b* schematically shows the device of FIG. 1*a* according to some embodiments.

In FIG. 1B, microscope 100, temperature-measuring device 120, and printer 140 of FIG. 1*a* are shown again, which together form a system or a domain 180 and which are to be used in the context of a certain workflow or processing operation, such as the examination of a sample, including the documentation thereof. When sitting at the microscope, a user may, for example, wish to use certain functionalities which the microscope itself may not be able to offer, or which it can only offer in variants with poorer quality. However, these functionalities may instead be provided by the temperature-measuring device, for example, and, through the approach proposed within the scope of the invention, can nevertheless be used by the user directly on the microscope.

In addition, a tablet 190 is schematically shown, by way of example, as a device that provides a (not further specified) input/output functionality in the sense of a user interface which the user carries with him/her.

As already explained with reference to FIG. 1*a*, each of the three devices 100, 120, 140 offers certain functionalities and "desires" certain functionalities, the latter of which may be both those which the device itself does not provide and those which it itself also provides or offers.

The user sitting at the microscope may, for example, wish to examine a sample with the microscope and capture images thereof during the workflow. To do this, the user needs the following functionalities: x-position of the sample stage (F1), y-position of the sample stage (F2), and z-position of the sample stage (F3) to be able to position the sample as desired. The user also needs the image acquisition functionality (F5) to be able to capture images of the sample. In addition, it is important, for example for documentation purposes, which illumination parameters are used, which is included in the metadata functionality (F10), for example. All these functionalities are provided by the microscope itself.

However, the workflow now additionally requires, for example, the measurement of temperature (F4) and humidity (F7) during the examination of the sample. The current date (F8) and time (F9) may also be required for documentation purposes. With the exception of temperature (F4), microscope 100 does not provide these functionalities itself, but temperature-measuring device 120 does.

According to embodiments of the invention, it is now provided, for example, that microscope 100 may desire these functionalities: F4, F7, F8, and F9 (see also FIG. 1*a*). Since temperature-measuring device 120 can provide these functionalities, microscope 100 selects them and establishes a payload connection with temperature-measuring device 120 for this purpose. This allows the user to use these functionalities: temperature (F4), humidity (F7), date (F8), and time (F9) directly on microscope 100 (e.g., on a user interface), although these functionalities are actually offered by temperature-measuring device 120.

As already mentioned, both microscope 100 and temperature-measuring device 120 offer the temperature functionality (F4) for temperature measurement. However, it may be that microscope 100 has only a simple temperature sensor incorporated therein, which allows temperature measurement with an accuracy of, for example, +/−1° C. In contrast, the (special) temperature-measuring device 120 allows temperature measurement with an accuracy of, for example, +/−0.01° C. In this respect, for most accurate temperature measurement or documentation, it is desirable, for example, to use the more accurate temperature measurement of temperature-measuring device 120. However, as a kind of fallback solution, provision could be made to nevertheless use the temperature measurement functionality integrated into microscope 100 if that of temperature-measuring device 120 is not available.

This can be controlled, for example, by a "rule set" as already mentioned, so that microscope 100 may desire or prefer the temperature functionality (F4), specifically with an accuracy of at least +/−0.05° C.; i.e., a "temperature measurement" or temperature functionality (F4) with the parameter: accuracy "+/−0.05° C.", and this functionality may be provided by the external temperature-measuring device 120; but if this temperature-measuring device 120 or the more accurate temperature measurement should not be available, the microscope 100 will fall back on the internal thermometer (sensor) or on other, also inferior, external thermometers. Regardless of this, microscope 100 can also make this "poorer" temperature measurement available to other devices or appliances, in that case as "temperature measurement with accuracy of +/−1° C."

Along these lines, a plurality of devices may provide similar functionalities or basically the same functionalities, but in different specific variants; but the devices can only desire certain variants thereof (e.g., temperature measurement with a certain accuracy). However, if necessary, they can nevertheless use a different variant, for example.

As already explained at the outset, tablet 190, for example, can also connect dynamically to microscope 100 when the user is at the microscope or in the same room as the microscope and carries the tablet with him/her. Inputs and outputs, for example, can then be made via tablet 190 (instead of via a control/display unit on the microscope).

Furthermore, the workflow may then, for example, require to document the examination, including the location or position (F12) of the examination, and to provide the documentation via a network (F13). Neither microscope 100 nor temperature-measuring device 120 offers these functionalities, but printer 140 does. However, a network connection is, for example, not permitted via tablet 190. Therefore, microscope 100 selects these functionalities (which it desires) and establishes a payload connection with printer 140 for this purpose. This allows the user to use these functionalities: position (F12) and network (F13) directly on microscope 100 (e.g., on a user interface or on or via tablet 190) although these functionalities are actually provided by printer 140.

The illustrated example further shows that that 140 printer also provides the required functionalities date (F8) and time (F9). Thus, microscope 100 could also use the printer for this purpose. As can be seen in FIG. 1*a*, printer 140 would, of course, also offer the functionalities color printing (F14) and black-and-white printing (F15), which microscope 100 can also make available, for example, to the user via the payload connection, but this functionality is not necessary for the exemplary workflow.

Similar to the temperature functionality (F4), however, such a fallback position could also be provided here. If microscope 100 should, for example, desire or want to integrate a printer, but no color printer is available, there is a fallback position (a "fallback desire") for integration of a b/w printer. Color printing and b/w printing could be specified as desired printing functionalities with an additional parameter regarding the printer type and could be implemented in combination with a corresponding rule set. It would then be important that, by means of corresponding rules, the second desire (b/w printing) only be activated if the first desire (color printing) is not fulfilled.

Thus, in the illustrated case, microscope 100 could desire the color printing functionality (F14), and only if this desire is not fulfilled or cannot be fulfilled could it desire the black-and-white printing functionality (F15). It should be noted in this regard that, depending on the embodiment, these two functionalities could also be used as a functionality with different variants, as is the case with the temperature functionality (F4).

If, for example, the user still wants to print something later, he or she can to go with his or her tablet 190 to printer 140, which may, for example, be located in a different room than the microscope, where tablet 190 can then connect to printer 140. Then, for example, an input can be made via tablet 190 (instead of via a control/display unit on the printer or if such a unit is not available there).

In summary, it can thus be seen that a wide variety of functionalities that are actually distributed across different devices (i.e., machines or parts thereof) can be made available to a user on one device.

At this point, it should be noted that, for the sake of clarity, FIG. 1B only lists those functionalities which are required within the framework of the exemplary workflow and indicates by which device these are (originally) provided.

Figure 2:
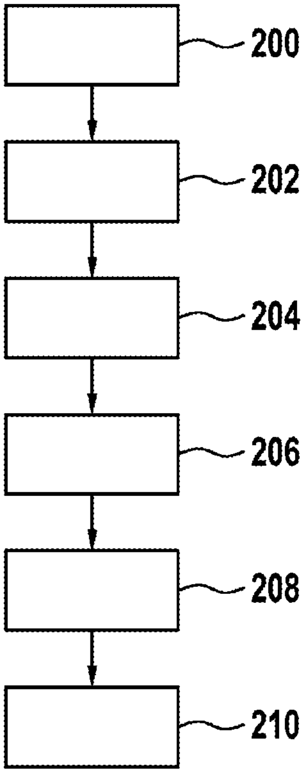
FIG. 2 schematically shows an operational sequence of a method according to some embodiments.

FIG. 2 schematically shows an operational sequence of a method according to the invention in a preferred embodiment, such as can be performed, for example, by a device or system shown in FIG. 1. The operational sequence will be described in more detail below, in particular with reference to FIG. 1*a*. Thus, in particular, a system or domain is made possible which can then be used in a workflow such as is described with reference to FIG. 1, for example.

First, in a step 200, the first parameter set 102 and the first parameter values are provided in microscope 100. This indicates which functionalities microscope 100 can provide (e.g., adjustment of an x-position of a sample stage) not only for itself (i.e., the microscope or a user of the microscope), but also for other devices, such as, for example, temperature-measuring device 120 or printer 140. In any case, it is not yet relevant at this point whether any of the other devices actually desires or needs these functionalities. If necessary, first parameter set 102 can also be updated time and again, for example, when one of the functionalities can or should no longer be made available for a particular reason.

In particular with regard to the latter aspect, it should be noted that, as already explained, a parameter value may also be set to active or not active, depending on whether a particular functionality is to be made available or not to be made available for a particular reason, for example, for security or data protection reasons.

In a step 202, the second parameter set 104 and the second parameter values are provided in microscope 100. This indicates which functionalities are to be made available to microscope 100 by other devices, such as, for example, a temperature or a temperature measurement. In any case, it is not yet relevant at this point whether or not any of the other devices is actually able to offer or make available these functionalities.

In a step 204, microscope 100, obtains the third parameter set 122 and the third parameter values, for example, from temperature-measuring device 120, via a connection 160 and the corresponding communication interfaces 119, 139. In this way, microscope 100 is informed about which functionalities temperature-measuring device 120 can make available to microscope 100.

In a step 206, third parameter set 122 is compared with second parameter set 104 in microscope 100 or, there, in comparison unit 118. In this way, it can be determined whether temperature-measuring device 120 can provide functionalities that microscope 100 would like to have or would like to be made available to it (i.e., which it "desires"). In the example shown (in FIG. 1*a*), these are the following: temperature, humidity, date, time, metadata, status. In particular, all parameter values of the two parameter sets can be compared in this comparison, but this may also be limited to the parameter values that are set to active, respectively.

If, for whatever reason, the third parameter value, position, is set to not active in temperature-measuring device 120; i.e., should not be made available to other devices, this parameter value does not need to be included in the comparison since this functionality would not be made available to the microscope anyway.

In a step 208, certain functionalities are selected for use in microscope 100 on the basis of the comparison; i.e. knowing which of the functionalities desired by microscope 100 can be provided by temperature-measuring device 120. In this connection, it is possible to select all functionalities which are desired by microscope 100 and which at the same time can be provided by temperature-measuring device 120. However, this is not a necessity.

Then, in a step 210, a payload connection 162 is established between microscope 100 and temperature-measuring device 120 using communication interfaces 119, 139, provided at least one of the functionalities has been selected. Via this payload connection, the functionalities of temperature-measuring device 120 can then be integrated into the microscope 120, so that, for example, a user of the microscope can also use these functionalities as described above with reference to FIG. 1B. For example, while viewing a sample, the user can adjust the sample stage (as functionalities of the microscope 100 itself) and at the same time also measure a (current) temperature (as functionalities made available to microscope 100 by temperature-measuring device 120), if necessary.

This procedure can be carried out in any of the devices; i.e., for example, also in temperature-measuring device 120 and in printer 140. In FIG. 1*a*, arrows between the functionalities of the individual devices indicate, purely by way of example, which device makes which functionality available to which other device. For this purpose, a payload connection is then required in each case.

This procedure is performed in particular in an automated or automatic fashion, and in particular also again and again (e.g., at certain intervals), so that, for example, new devices can be automatically integrated into the system or group, and functionalities that can be provided by the individual devices themselves or through integration are always maintained up-to-date. Thus, for example, if the color printing functionality in printer 140 is initially set to not active and is then set by a user to active, the color printing functionality can then also be offered in microscope 100 through the repeatedly performed procedure as described above, provided this is a desired functionality, while this was previously not the case.

Figure 3:
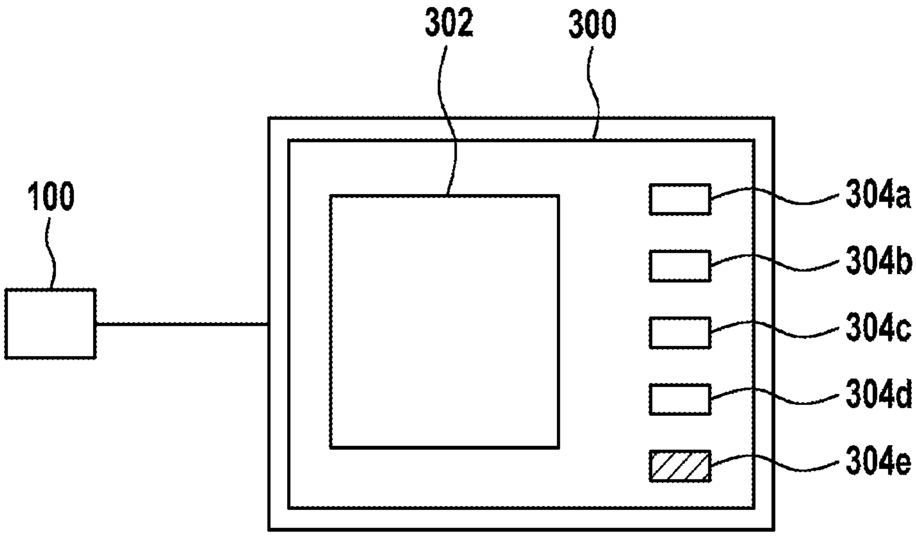
FIG. 3 schematically shows a display as part of a device according to some embodiments.

FIG. 3 shows, by way of example, a display 300 as part of a device according to the invention in a further preferred embodiment, for example, as part of the (then digital) microscope 100. Display 300 may be integrated into microscope 100 or may also be provided and connected as an accessory. Display 300 may be a touch display, for example. However, the mentioned tablet 190, for example, can also perform this function.

The display shows a user interface in the form of what is called a graphical user interface (GUI), which includes an image 302 of an object viewed by means of the microscope and also, by way of example, five (digital) input and display means 304*a*, 304*b*, 304*c*, 304*d*, 304*e*, which represent the functionalities mentioned with respect to FIG. 1*a*: x-position of a sample stage (F1), y-position of a sample stage (F2), z-position of a sample stage (F3), temperature (F4), image acquisition (F5).

While the first three of these, (F1, F2, F3), are provided by the microscope, the temperature functionality (F4) is provided by the temperature-measuring device and integrated into the microscope, as indicated in FIG. 1*a*. The image acquisition functionality (F5) can in principle be provided by microscope 100, as indicated with reference to FIG. 1*a*; however, in the example shown here, it is assumed that is not possible, for example, because of a defect in the camera of the microscope or because the particular microscope does not have a camera, and that this functionality cannot be provided by any of the (other) available devices either. Therefore, the corresponding input and display means 304*e* is grayed out.

In this context, it should be noted that this is merely exemplary. It is conceivable here, for example, that a camera to be used with the microscope may not be integrated as a separate device, or that an additional camera could be provided.

The term "and/or" includes any and all combinations of one or more of the associated listed items and may be abbreviated as "/".

Although some aspects have been described in the context of a device, it is clear that these aspects also represent a description of the corresponding method, where a block or device corresponds to a method step or a feature of a method step. Analogously, aspects described in the context of a method step also represent a description of a corresponding block or item or feature of a corresponding device.

Some exemplary embodiments relate to a microscope that includes a processing or computing unit as described in connection with one or more of FIGS. 1 through 3. Alternatively, a microscope may be part of or connected to a processing or computing unit such as described in connection with one or more of FIGS. 1 through 3. FIG. 1*a* shows in schematic form a processing or computing unit 118 configured to perform a method as described herein. Processing or computing unit 118 is part of a microscope 100 and represents a computer system. Microscope 100 is configured, for example, to acquire images and is connected to computer system 118. Computer system 118 is configured to perform at least a portion of a method described hereby. Computer system 118 may be configured to execute a machine-learning algorithm. Computer system 118 and microscope 100 may be separate units, but may also be integrated into a common housing. Computer system 118 could be part of a central processing system of microscope 100 and/or computer system 118 could be part of a subcomponent of microscope 100, such as a sensor, an actuator, a camera, or an illumination unit, etc., of microscope 100.

Computer system 118 may be a local computer device (e.g., personal computer, laptop, tablet computer, or mobile phone) having one or more processors and one or more memory devices or may be a distributed computer system (i.e., a cloud computing system having one or more processors and one or more memory devices distributed at different locations, such as, for example, at a local client and/or one or more remote server farms and/or data centers). Computer system 118 may include any circuit or combination of circuits. In an exemplary embodiment, computer system 118 may include one or more processors of any type. As used herein, "processor" may mean any type of computing circuit, such as, for example, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field-programmable gate array (FPGA) of, for example, a microscope or a microscope component (e.g., camera), or any other type of processor or processing circuit. Other types of circuits that may be included in computer system 118 include a custom-built circuit, an application-specific integrated circuit (ASIC), or the like, such as, for example, one or more circuits (e.g., a communication circuit) for use in wireless devices such as mobile phones, tablet computers, laptop computers, radio phones, and similar electronic systems. Computer system 118 may include one or more memory devices, which may include one or more memory elements suitable for the particular application, such as, for example, a main memory in the form of a random access memory (RAM), one or more hard disks, and/or one or more drives that handle removable media such as CDs, flash memory cards, DVDs, and the like. Computer system 118 may also include a display device, one or more loudspeakers, and a keyboard, and/or a controller, which may include a mouse, a trackball, a touch screen, a voice recognition device, or any other device allowing a system user to input information to computer system 118 and receive information therefrom.

Some or all of the method steps may be executed by (or using) a hardware apparatus, such as, for example, a processor, a microprocessor, a programmable computer, or an electronic circuit. In some exemplary embodiments, one or more of the most important method steps may be executed by such an apparatus.

Depending on certain implementation requirements, exemplary embodiments of the invention can be implemented in hardware or in software. The implementation can be performed using a non-volatile storage medium such as a digital storage medium, for example a hard disk (HDD), an SSD, a floppy disk, a DVD, a Blu-Ray, a CD, a ROM, a PROM, an EPROM, an EEPROM, or a FLASH memory, having electronically readable control signals stored thereon, which cooperate (or are capable of cooperating) with a programmable computer system such that the respective method is performed. Therefore, the digital storage medium may be computer-readable.

Some exemplary embodiments according to the invention include a data carrier having electronically readable control signals which are capable of cooperating with a programmable computer system such that one of the methods described herein is performed.

Generally, exemplary embodiments of the present invention can be implemented as a computer program product with a program code, the program code being operative for performing one of the methods when the computer program product runs on a computer. The program code may, for example, be stored on a machine-readable carrier.

Other exemplary embodiments include the computer program for performing one of the methods described herein, stored on a machine-readable carrier.

In other words, one exemplary embodiment of the present invention is therefore a computer program having a program code for performing any of the methods described herein when the computer program runs on a computer.

A further exemplary embodiment of the present invention is therefore a storage medium (or a data carrier or a computer-readable medium) including a computer program stored thereon for performing one of the methods described herein when executed by a processor. The data carrier, the digital storage medium, or the recorded medium are typically tangible and/or non-transitionless. Another exemplary embodiment of the present invention is a device as described herein that includes a processor and the storage medium.

A further exemplary embodiment of the invention is therefore a data stream or a sequence of signals representing the computer program for performing one of the methods described herein. The data stream or the sequence of signals may, for example, be configured to be transferred via a data communication connection, for example via the Internet.

A further exemplary embodiment includes a processing means, for example, a computer or a programmable logic device, configured or adapted to perform one of the methods described herein.

A further exemplary embodiment includes a computer having installed thereon the computer program for performing one of the methods described herein.

A further exemplary embodiment according to the invention includes an apparatus or a system configured to transfer (for example, electronically or optically) a computer program for performing one of the methods described herein to a receiver. The receiver may, for example, be a computer, a mobile device, a memory device, or the like. The apparatus or system may, for example, include a file server for transferring the computer program to the receiver.

In some exemplary embodiments, a programmable logic device (e.g., a field-programmable gate array (FPGA)) may be used to perform some or all of the functionalities of the methods described herein. In some exemplary embodiments, a field-programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for providing functionalities, comprising:

at least one storage unit in which a first parameter set and a second parameter set are provided, wherein the first parameter set includes one or more first parameter values representing functionalities that the device can provide to or for other devices, wherein the one or more first parameter values indicate a functionality of the functionalities, wherein the second parameter set includes one or more second parameter values representing functionalities that the device can't provide to or for other devices, and wherein the one or more second parameter values indicate a functionality of the functionalities that the device can't provide;

a communication interface configured to obtain a third parameter set from a second device, wherein the third parameter set includes third parameter values representing functionalities that the second device can provide to the device, and wherein the third parameter values indicate a functionality of the functionalities of the second device; and a processing unit configured to:

compare the third parameter set with the second parameter set;

select, based on the comparison, one or more of the functionalities provided by the second device; and establish a payload connection between the device and the second device if at least one of the one or more functionalities provided by the second device has been selected for use, wherein the payload connection transmits control signals from the device to the second device for executing the selected one or more functionalities provided by the second device, and data from the second device to the device that is obtained by the execution of the selected one or more functionalities.

2. The device as recited in claim 1, wherein the communication interface includes at least one of: a wired interface, a wireless interface, an optical interface, an inductive interface, or an acoustic interface.

3. The device as recited in claim 1, further comprising elements, the elements including at least one of: an actuator, a sensor, a data storage unit, a data read unit, a data output unit, a computing unit, a control unit, a power supply, or a peripheral device connected to the device; and wherein functionalities of at least one element of the elements are indicated in the first parameter set with associated first parameter values.

4. The device as recited in claim 3, wherein the sensor comprises at least one of: a temperature sensor, a pressure sensor, a position sensor, a GPS sensor, an acceleration sensor, a current sensor, a voltage sensor, an optical sensor, an image sensor, a motion sensor, or a humidity sensor.

5. The device as recited in claim 1, comprising or being part of at least one of: a computer, a microscope, a microtome, a high-pressure freezer, an automated stainer, a coater, a pipetting robot, a pick-and-place robot, a climate chamber, a laboratory automation device, a motorized stage, a heating system, a cooling system, an injection system, or an illumination device.

6. A system comprising the device according to claim 1 and the second device, including:

at least one storage unit in which the third parameter set is provided; and a communication interface configured to output at least portions of the third parameter set.

7. A method for providing functionalities, comprising:

providing, in the device according to claim 1, the first parameter set including the one or more first parameter values;

providing, in the device, the second parameter set including the one or more second parameter values;

obtaining the third parameter set of the second device, the third parameter set including the third parameter values;

comparing the third parameter set with the second parameter set, selecting, based on the comparison, the one or more of the functionalities of the second device; and establishing the payload connection with the second device.

8. The method as recited in claim 7, further comprising:

obtaining a fourth parameter set of the second device, the fourth parameter set including fourth parameter values indicating which functionalities associated with the fourth parameter values are desired by the second device;

comparing the fourth parameter set with the first parameter set; and based on the comparison, sending to the second device a message indicating which desired functionality can be made available.

9. The method as recited in claim 7, wherein the one or more first parameter values, the one or more second parameter values, and the third parameter values are set as active or not active and wherein the comparison includes:

comparing the one or more second parameter values and the third parameter values for each of the associated functionalities indicated in the second and third parameter sets.

10. The method as recited in claim 9, further comprising:

selecting a functionality of the second device for use if the second and third parameter values are set as active for the selected functionality.

11. The method as recited in claim 7, wherein each functionality is identified by a unique identifier.

12. The method as recited in claim 7, further comprising:

storing obtained parameter values for the associated functionalities.

13. The method as recited in claim 7, further comprising:

outputting a first partial parameter set which contains at least a portion of the one or more first parameter values, and/or outputting a second partial parameter set which contains at least a portion of the one or more second parameter values, for reception by further devices.

14. The method as recited in claim 13, wherein the outputting is accomplished by transmission to one or more further devices that are connected to the device.

15. The method as recited in claim 13, wherein the outputting is accomplished by a broadcast message.

16. The method as recited in claim 13, wherein the outputting is performed in response to a request to output the first parameter set and/or the second parameter set.

17. The method as recited in claim 7, wherein the functionalities include at least one of:

controlling an actuator in the device, outputting data stored in the device, outputting data measured by the device, processing data by the device, or a property of the device.

18. The method as recited in claim 7, further comprising:

establishing another payload connection with a further device in response to a use request, and making a functionality specified in the use request available to the further device.

19. The method as recited in claim 7, wherein each of the parameter values of the one or more first parameter values is specified as an attribute of an object that is associated with a functionality of the functionalities that the device can provide.

20. A non-transitory computer-readable medium having program code stored thereon, the program code, when executed by a computer processor, facilitating performance of a method according to claim 7.

* * * * *